(12) United States Patent
Shenoy (10) Patent No.: US 7,689,957 B2
(45) Date of Patent: Mar. 30, 2010

(54) IDENTIFYING AND IMPROVING ROBUST DESIGNS USING STATISTICAL TIMING ANALYSIS

(75) Inventor: Narendra V. Shenoy, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 309 days.

(21) Appl. No.: 11/853,009

(22) Filed: Sep. 10, 2007

(65) Prior Publication Data

US 2009/0070714 A1 Mar. 12, 2009

(51) Int. Cl.
G06F 17/50 (2006.01)

(52) U.S. Cl. .......................................... 716/6
(58) Field of Classification Search ............... 716/6
See application file for complete search history.

(56) References Cited

U.S. PATENT DOCUMENTS

| | | | |
|---|---|---|---|
| 5,636,372 A * | 6/1997 | Hathaway et al. | 713/500 |
| 2005/0065765 A1* | 3/2005 | Visweswariah | 703/19 |
| 2005/0066298 A1 | 3/2005 | Visweswariah | |
| 2007/0089077 A1 | 4/2007 | Sumikawa | |
| 2008/0072198 A1* | 3/2008 | Celik et al. | 716/6 |

OTHER PUBLICATIONS

Jyu et al.: "Statistical Timing Analysis Of Combinational Logic Circuits", IEEE Transactions On Very Large Scale Integration (VLSI) Systems, vol. 1, No. 2, Jun. 1993, pp. 126-137.

Berkelaar: :Statistical Delay Calculation, a Linear Time Method, Eindhoven University of Technology, The Netherlands, pp. 1-10.

Liou et al: "Fast Statistical Timing Analysis By Probabilistic Event Propagation", DAC 2001, Jun. 18-22, 2001, Las Vegas, NV, Copyright 2001, pp. 661-666.

Orshansky et al., "A General Probabilistic Framework For Worst Case Timing Analysis", DAC 2002, Jun. 10-14, 2002, New Orleans LA, Copyright 2002, pp. 556-561.

Jess et al., "Statistical Timing For Parametric Yield Prediction Of Digital Integrated Circuits", DAC 2003, Jun. 2-6, 2003, Anaheim, CA, Copyright 2003, pp. 932-937.

Agarwal et al., "Statistical Timing Analysis Using Bounds And Selective Enumeration", IEEE Transactions On Computer-Aided Design Of Integrated Circuits And Systems, vol. 22, No. 9, Sep. 2003, pp. 1243-1260.

(Continued)

*Primary Examiner*—Jack Chiang
*Assistant Examiner*—Brandon W Bowers
(74) *Attorney, Agent, or Firm*—Bever, Hoffman & Harms, LLP; Jeanette S. Harms (57) ABSTRACT

Statistical timing analysis techniques can be used to lead to the construction of robust circuits in a consistent manner through the entire design flow of synthesis, placement and routing. An exemplary technique can include receiving library data for a design including timing models. By comparing implementations of this data, a robust circuit can be defined based on a set of criteria, which can include worst negative slack, endpoint slack distribution, timing constraint violations, and total negative slack. At this point, statistical timing analysis can be used to drive logic changes that generate improved robustness in the design. The statistical timing analysis can use a static timing delay associated with the arc in statistical timing analysis as a mean and a specified percentage of the mean as the standard deviation.

8 Claims, 5 Drawing Sheets

OTHER PUBLICATIONS

Chang et al., "Statistical Timing Analysis Considering Spatial Correlations Using A Single Pert-Like Traversal", ICCAD '03, Nov. 11-13, 2003, San Jose, CA, Copyright 2003, pp. 621-625.

Devgan et al., "Block-Based Static Timing Analysis With Uncertainty", ICCAD '03, Nov. 11-13, 2003, San Jose, CA, Copyright 2003, pp. 607-614.

Bhardwaj et al., "TAU: Timing Analysis Under Uncertainty", ICCAD 03, Nov. 11-13, 2003, San Jose, CA, Copyright 2003, pp. 615-620.

Visweswariah et al., "First-Order Incremental Block-Based Statistical Timing Analysis", DAC 2004, Jun. 7-11, 2004, San Diego, CA, Copyright 2004, pp. 331-336.

Najm et al., "Statistical Timing Analysis Based On A Timing Yield Model", DAC 2004, Jun. 7-11, 2004, San Diego CA, Copyright 2004, pp. 460-465.

Orshansky et al.,: "Fast Statistical Timing Analysis Handling Arbitrary Delay Correlations", DAC 2004, Jun. 7-11, 2004, San Diego, CA, Copyright 2004, pp. 337-342.

Li et al., "Asymptotic Probability Extraction For Non-Normal Distributions Of Circuit Performance", 2004 IEEE, pp. 2-9.

Zhang et al., "Correlation-Preserved Non-Gaussian Statistical Timing Analysis With Quadratic Timing Model", DAC 2005, Jun. 13-17, 2005, Anaheim, CA, Copyright 2005, pp. 83-88.

Heloue et al., "Statistical Timing Analysis With Two-Sided Constraints", 2005 IEEE, pp. 828-835.

Guthaus et al., "Gate Sizing Using Incremental Parameterized Statistical Timing Analysis", 2005 IEEE, pp. 1029-1036.

\* cited by examiner

IDENTIFYING AND IMPROVING ROBUST DESIGNS USING STATISTICAL TIMING ANALYSIS

BACKGROUND OF THE INVENTION

1. Field of the Invention

The invention relates to integrated circuit (IC) designs and in particular to identifying robust designs and improving such design using statistical timing analysis.

2. Related Art

Figure 1:
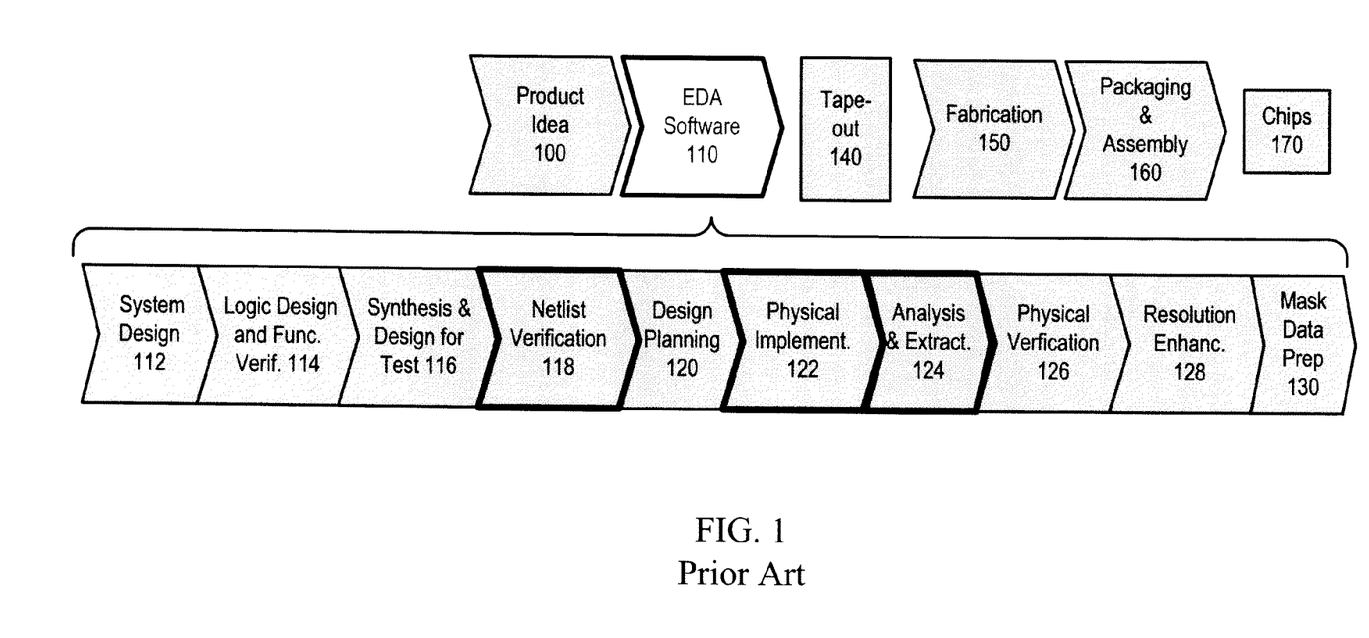
FIG. 1 illustrates a simplified representation of an exemplary digital ASIC design flow.

FIG. 1 illustrates a simplified representation of an exemplary digital IC design flow. At a high level, the process starts with the product idea (step 100) and is realized in an EDA software design process (step 110). When the design is finalized, it can be taped-out (event 140). After tape out, the fabrication process (step 150) and packaging and assembly processes (step 160) occur resulting, ultimately, in finished chips (result 170).

The EDA software design process (step 110) is actually composed of a number of steps 112-130, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 110) will now be provided:

System design (step 112): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at the physical and electrical levels. Exemplary EDA software products from Synopsys, Inc. that can be used at this step include AstroRail, PrimeRail, Primetime, and Star RC/XT products.

Physical verification (step 126): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks for lithographic use to produce finished chips. Exemplary EDA software products from Synopsys, Inc. that can be used at this step include the CATS(R) family of products.

Netlist verification (step 118) can provide the expected timing of a digital circuit without simulation. This netlist verification technique, called static timing analysis (STA), provides a detailed analysis of the timing behavior of the circuit independent of the combinations of input values.

In STA terminology, a timing constraint is a budget of time that is available for circuit signals to propagate and be satisfactorily read at an output or captured by a memory element. The timing constraints are captured by user-specified information such as the clocking scheme, output loads, etc. A "critical path" is defined as the path between an input pin or an output of a memory element and an output pin or an input of a memory element which violates a timing constraint. The pin at which the timing check is performed is called an endpoint. Timing constraints can be categorized into two forms. A set-up constraint is one that requires the signal to be stable no later than the budget. A hold constraint is one that requires the signal to change no earlier than the budget. For sake of exposition and without loss of generality, only the first form is referred to herein. The arrival time of a pin is defined as time that the signal at the pin stabilizes. In static timing, the arrival can be computed using the "add" and "maximum" operations. The required time of a pin is the time at which the signal must stabilize to meet a timing constraint. In static timing, the required time can be computed using the "subtract" and "minimum" operations. The "slack" of a pin can be defined as the difference between the required time and the arrival time. Thus, a positive slack means that the overall delay of the circuit is acceptable (and, if desirable, arrival time at that pin can even be increased), whereas a negative slack means that the path is too slow and therefore must be sped up to avoid adversely affecting the overall delay of the circuit.

Over the last few years, variations in delay have concerned many in the industry. Delay variations can arise from changes in the operating conditions such as voltage and temperature as well as process variations that arise during manufacturing. However, in the context of a design flow, variations in delay can also stem from the optimization in down-stream tools, the refinement of models used in computation as the design evolves, and any changes to the design (i.e. specification changes).

Unfortunately, characterizing each cause of the change and then attempting to define the "robustness" of a circuit with respect to that change would require significant resource allocation. Therefore, there arises a need for a method and an apparatus to construct change-tolerant designs in a cost-effective manner.

A relatively new extension to static timing analysis known as statistical timing analysis has been introduced. This technology has been designed to model variations in circuit delays caused by process variations. Delays are represented by statistical distributions and the analysis step propagates distributions for arrival (required) times by applying the "add" and "maximum" ("subtract" and "minimum") operations to these distributions. This approach requires significant resource allocation to characterizing the delay behavior for each process change.

SUMMARY OF THE INVENTION

In accordance with one aspect of the invention, statistical timing analysis techniques are used for the construction of robust circuits in a consistent manner through the entire design flow of synthesis, placement and routing. An exemplary technique can include receiving library data for a design including timing models. By comparing implementations of this data, the tolerance of a circuit to delay variations can be characterized using several criteria. Typical criteria can include worst negative slack, endpoint slack distribution, number of timing constraint violations, and total negative slack. These criteria are defined using well known concepts in static timing analysis. At this point, statistical timing analysis can be used to drive logic changes that generate improved robustness in the design.

Notably, statistical timing analysis models a statistical delay distribution on an arc (i.e. a path between pins) of the design in static timing analysis (STA). The need for characterization delay changes to each source of variation can be advantageously circumvented by using the delay associated with an arc in static timing analysis as a mean and a user-specified percentage of the mean as the standard deviation. Thus, in this method statistical timing analysis attributes the variation to the gates without seeking to identify the cause, while using the typical behavior for gate delays. As a result, each path can be appropriately constrained. For example, longer paths have larger variation with bigger opportunity for statistical cancellation to appear on the mean delay.

In one embodiment, performing the statistical timing analysis can further include determining a slack distribution at endpoints of the design for use as a cost metric in design optimization. For example, the cost metric can include computing a probability of an endpoint failing to meet timing constraints. The probability can be computed from statistical timing analysis (which provides a probability density function for the arrival time at an end-point). Notably, this probability can also be used to improve the robustness of the design.

As described in further detail below, statistical timing analysis technology developed in the context of handling process variations can be advantageously used to guide the optimization for robust circuits.

DETAILED DESCRIPTION OF THE FIGURES

Various steps of an integrated circuit (IC) design flow (e.g. synthesis, placement, clock tree analysis, and routing) use delays of gates and nets for optimization. However, these delays may vary significantly between steps. For example, in the absence of feedback, optimizing downstream tools can result in different delay computations. Moreover, models for later stages in the IC design flow are typically more accurate because more information is then available. Other delay variations may be due to changing the specification (e.g. a user targeting 550 MHz versus 500 MHz), technology (i.e. the process used in fabrication), or operating conditions (i.e. the environment including, but not limited to, temperature, rail power supply, etc.). Characterizing each cause of a delay change and defining robustness with respect to the change is a complex task that inhibits its commercialization.

Notably, as described hereafter, the definition of a "robust" circuit can be general enough to apply to each step of the IC design flow while allowing the construction of change-tolerant designs in a cost-effective manner. Thus, a robust circuit in the synthesis step will probably also be a robust circuit in the placement step (or at the least minimize problems in the placement step). Note also that the concept of robustness is comparative rather than absolute. Thus, robustness, as described herein, is based on comparing a plurality of circuits. Advantageously, robustness can be generically defined using the STA concept of negative slack.

A robust circuit can be defined as meeting certain criteria. For example, using one simple definition, a circuit C is more robust than circuit D if the following three criteria are met. First, circuit C has identical or better worst negative slack than circuit D. Second, circuit C has identical or better total negative slack than circuit D. Third, circuit C has much fewer endpoints in the design that violate timing constraints than circuit D (wherein an endpoint is any point where if there is a violation, then the circuit fails).

Another definition for a robust circuit using endpoint slack distribution can also be developed. In one embodiment, the endpoints (sorted with increasing slack) can be plotted with the endpoint number as the x-value and the slack as the y-value. The resulting curve is called an endpoint slack distribution curve. In one embodiment, circuit C is more robust than circuit D if its endpoint slack distribution curve lies entirely above the endpoint slack distribution curve for circuit D. If limited sections of one curve extend above the other curve, then it may be beneficial to determine the circuit whose left most portion of the curve (most critical) is above to be more robust.

Figure 2:
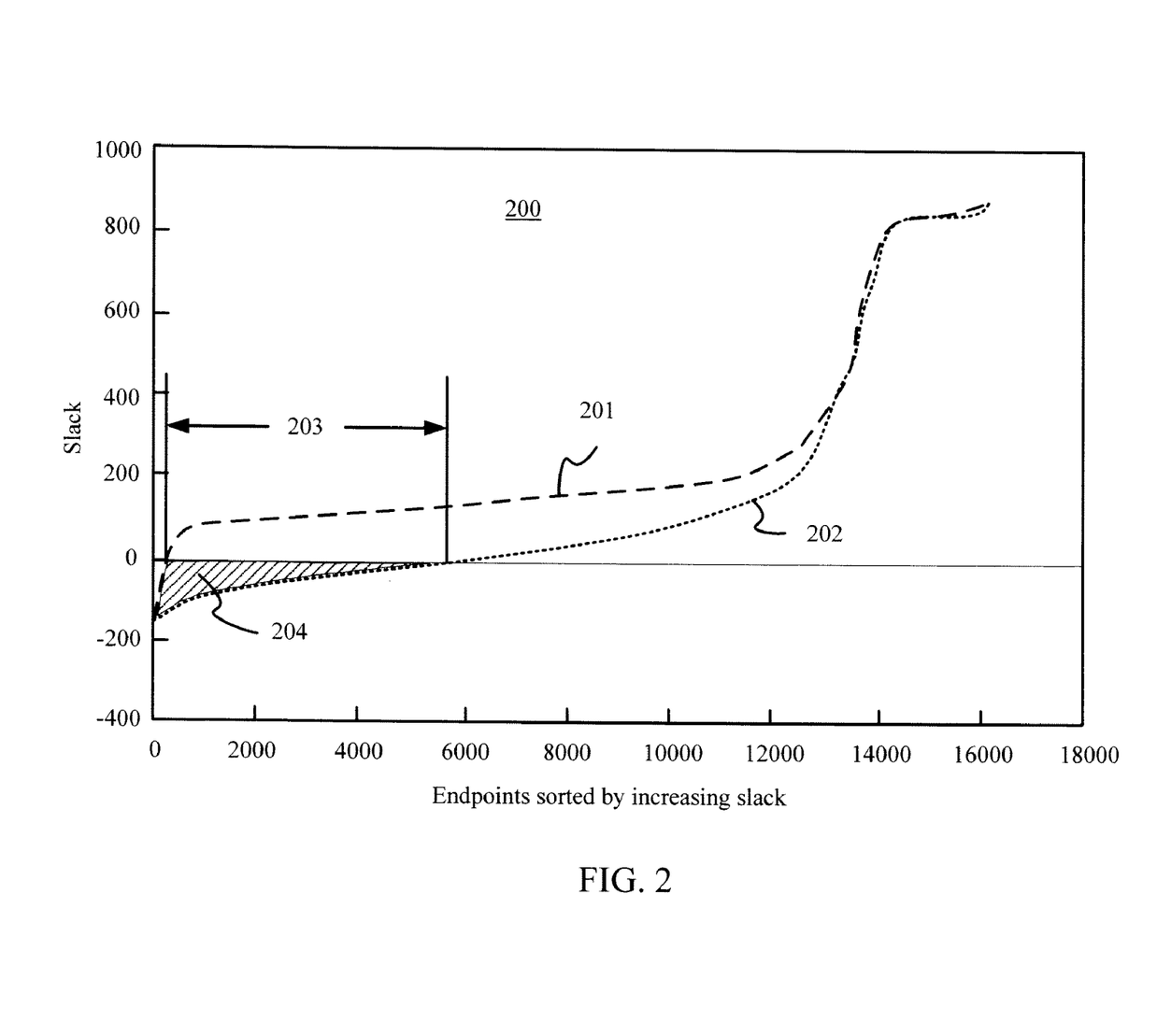
FIG. 2 illustrates an endpoint slack distribution graph plotting two implementations of the same design/circuit after static timing analysis in the synthesis step.

For example, FIG. 2 illustrates an endpoint slack distribution graph 200 plotting two implementations of the same design/circuit after static timing analysis in the synthesis step. These implementations are shown by curves 201 and 202. Designs can have any number of endpoints, e.g. up to tens or even hundreds of thousands of endpoints. The two circuit implementations in FIG. 2 each have approximately 16,000 endpoints that are sorted from worst negative slack to best positive slack.

In graph 200, because curve 201 lies entirely above curve 202, the circuit represented by curve 201 is more robust than the circuit implementation represented by curve 202. In other words, given the two circuits subjected to variations, the circuit represented by curve 201 is less likely to incur failures than the circuit associated with curve 202. Specifically, note that the circuit represented by curve 201 has significantly fewer violating endpoints as shown by an endpoint range 203 (which starts at the point where curve 201 crosses the zero slack axis and ends where curve 202 crosses the zero slack axis). Moreover, the circuit represented by curve 201 has better total negative slack than the circuit represented by curve 201. Note that the total negative slack of a circuit is the area between the portion of the curve below the x-axis and the x-axis. The measure of improvement in total negative slack associated with curve 201 is indicated in graph 200 by an area 204 (which is defined by the area above curve 202, below the zero slack axis, and not including the total negative slack associated with the circuit represented by curve 201). Note that all metrics above are well defined in the context of static timing analysis.

Figures 3A, 3B:
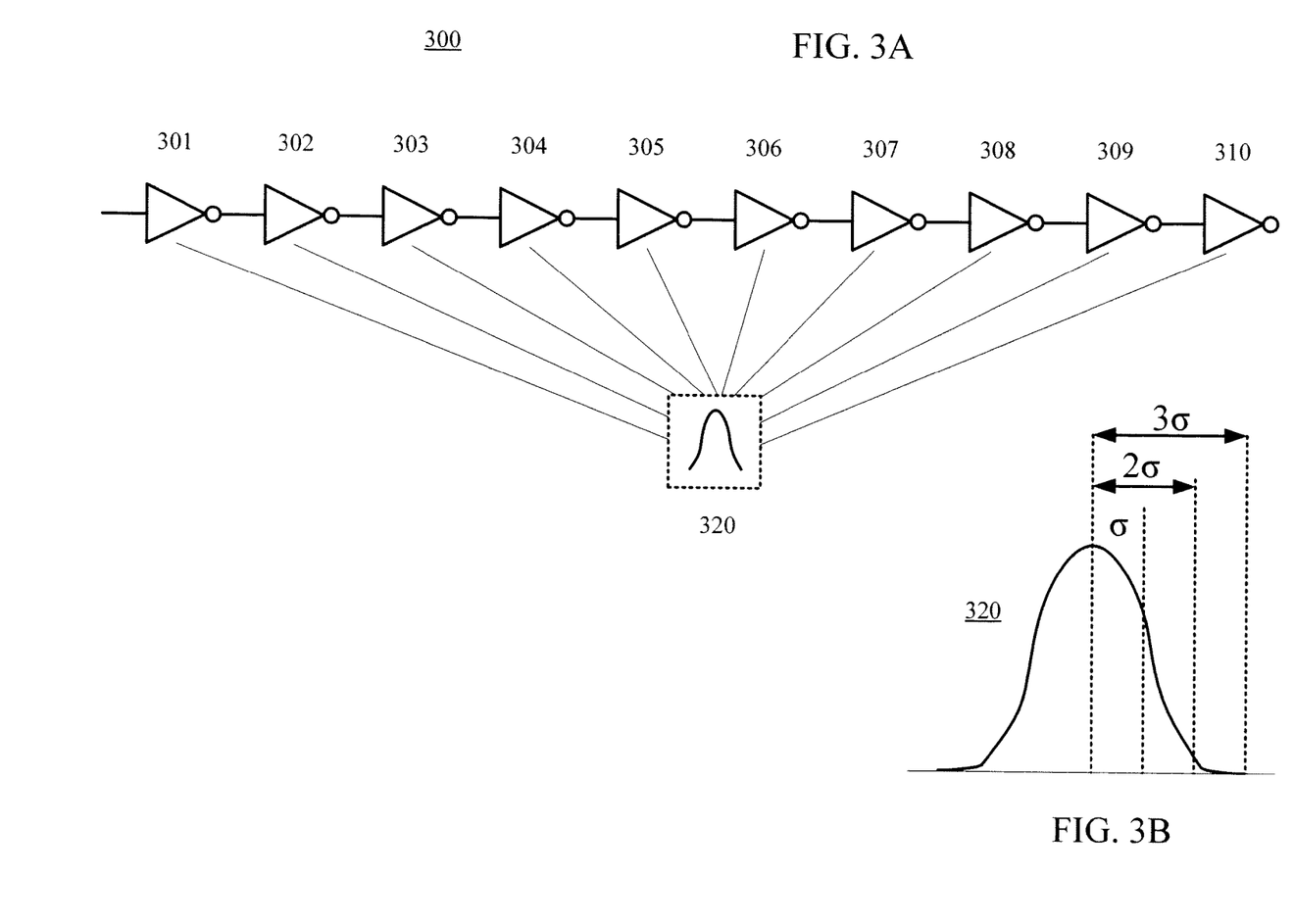
FIG. 3A illustrates an inverter chain which includes a plurality of inverters, wherein each inverter has a gate delay represented by possibly different normal distribution curves.
FIG. 3B illustrates a normal distribution for a gate that includes approximately 100% of possible values for the delay within 3 standard deviations from the mean.

In accordance with analyzing a logic gate (hereinafter gate) using statistical timing, the gate delay is recognized to have a mean and a standard deviation (as opposed to static timing that would have a fixed number to represent gate delay). For example, referring to FIG. 3A, an inverter chain 300 includes 10 inverters 301-310, each inverter having a gate delay represented by a normal distribution 320. Note that inverters 301-310 can have different values of means and standard deviations (thus, normal distribution 320 is merely meant to represent a generic normal distribution). In the normal distribution 320 and referring to FIG. 3B, the mean ($\mu$) occurs at the mid-point of the gate delay values (x-axis). Approximately 68% of the values are within one standard deviation ($\sigma$) from the mean, approximately 95% of the values are within two standard deviations ($2\sigma$) from the mean, and approximately 100% are within three standard deviations ($3\sigma$) from the mean. Because the y-axis in a normal distribution represents probability, the probability of the gate having a delay less than or greater than a particular value can be found by determining the area under the curve of normal distribution 320 using that particular value to define an edge. Thus, each inverter has a probability density function (PDF). Statistical timing analysis provides the basis to compute the PDF for the arrival time of any pin (such as the output of inverter 310) from the gate delay PDFs. The PDF for the arrival time of a pin can be used to compute the probability of the pin failing to meet timing.

The key observation to using statistical timing analysis to construct robust circuits is that statistical timing analysis can expose critical paths in the circuit which are normally hidden by static timing analysis. Specifically, consider the case where multiple critical paths converge at the output pin of a gate (e.g. an AND gate, an OR gate, etc.). In this case, each path has the same mean delay and standard deviation values. When a statistical maximum computation is carried out for the output pin, the resultant mean of statistical maximum is greater than the individual mean of each of the paths. The larger the number of paths, the greater the push out of the statistical mean. This computation can be characterized as "exposing" the number of critical paths. For example, the statistical maximum of two arrival distributions that are identical and normal with mean 5.0 and standard deviation 0.1 is approximated by a normal distribution with mean 5.05 and standard deviation 0.08. In contrast, a static analysis to determine a maximum delay value is unable to differentiate between cases with different number of critical paths. For example the static maximum of one or more arrival values of 5.0 is still 5.0. Thus, in a statistical timing analysis, a pin with multiple critical paths has a larger arrival time mean (compared to a static mean). As a result, statistical timing analysis advantageously obviates the need for concepts such as critical range and tie counts (which are used in circuit optimization using static timing analysis). A similar behavior is seen when the statistical minimum is computed for the required time computation for critical distributions. In this case, the resultant mean of the statistical minimum is smaller than the individual mean of each.

Figure 3C:
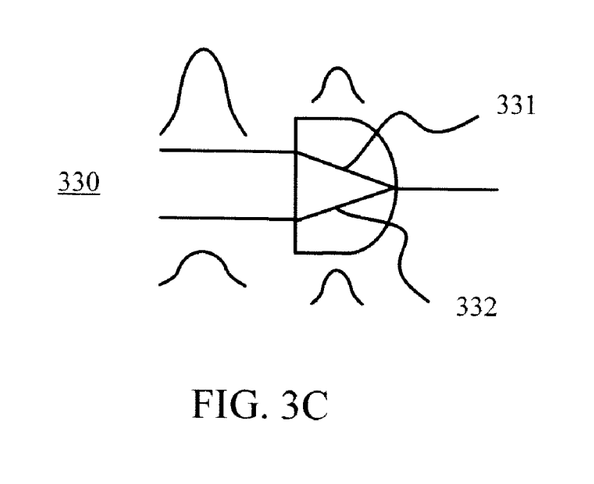
FIG. 3C illustrates an exemplary gate that has delays associated with input paths and internal paths (both referenced generically as arcs).
Figure 3D:
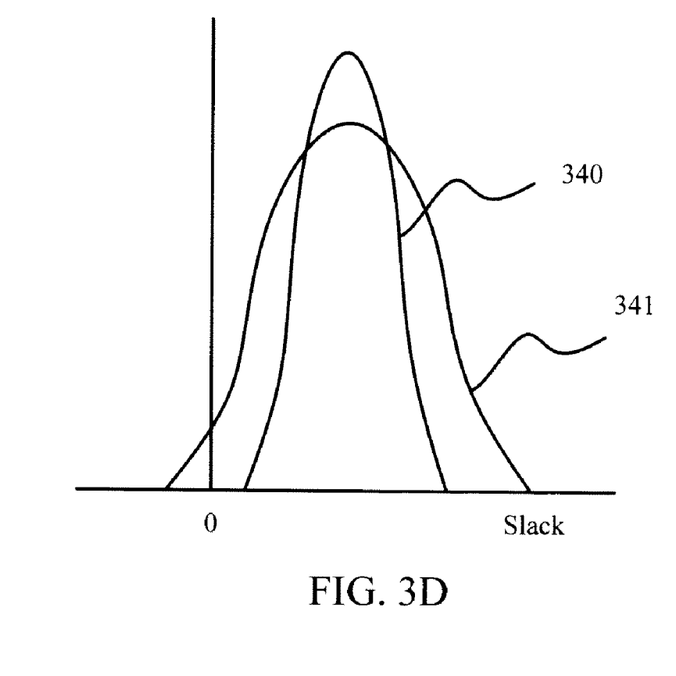
FIG. 3D illustrates how variation can be reduced by making a gate faster.

Note that each gate also has delays associated with each internal path of the gate. For example, referring to FIG. 3C, the paths 331, 332 of an AND gate 330 have delays that can be analyzed using statistical timing analysis. Notably, referring to FIG. 3D, a faster gate (i.e. internal paths of that gate) has a smaller standard deviation (as shown by normal distribution 340) and thus a smaller variation than a slower gate (as shown by normal distribution 341). Specifically, in this example, the faster gate has only positive slack for an arc, which provides one indication of more robustness than the slower gate (which might have negative slack). Thus, using statistical timing analysis can advantageously direct circuit optimization. In one embodiment, variations of input paths can affect the maximum operation (not including critical paths).

In static design, a designer has a budget allocated to handle delay variations in the design. This budget (b) is typically a percentage (%) of a target clock. Unfortunately, the budget can only be set on the clock edges, which has the effect of tightening timing more than required. Moreover, b changes over time because of optimization in downstream tools, refinement of models, and/or changes in specifications, technology, or environment thereby, resulting in different timing constraint files. Therefore, static design has several disadvantages that result in sub-optimal designs and/or processes.

In contrast, in statistical design, the designer does not need to differentiate between timing variability due to optimization in downstream tools, refinement of models, and/or changes in specifications, technology, or environment. Specifically, in statistical design, the static gate delay can be used as a mean ($\mu$) and the budget b can be used as a % standard deviation ($\sigma$) on the gate delay. Notably, statistical design does not suffer from over-constraining, thereby allowing each path to get its appropriate variation.

In one embodiment, the variability (or standard deviation) can be specified by a user as percentage of the mean. For example, the variability of each gate can be set to be the percentage of the clock period that is budgeted for delay variations. This sets the same number for all gates in the design. In an alternate embodiment, if delay ranges for gates are known (and are different for different gates); an estimate of variability can be computed from the difference between the worst case delay and the typical delay for each gate.

In summary, statistical timing analysis technology is developed in the context of handling process variations to guide the optimization for robust circuits. Specifically, rather than rely on process data to specify the delay model, the delay provided by static timing analysis can be used as the mean and a user-specified percentage of the mean can be used as the standard deviation. Thus, statistical timing analysis attributes the variation budget to the gates, while using the typical behavior for gate delays.

As a result, each path can be appropriately constrained. For example, longer paths have larger variation with bigger opportunity for statistical cancellation to appear on the mean delay. Using statistical timing analysis can advantageously drive logic changes that favor optimization metrics beneficial for robust circuits.

Figure 4:
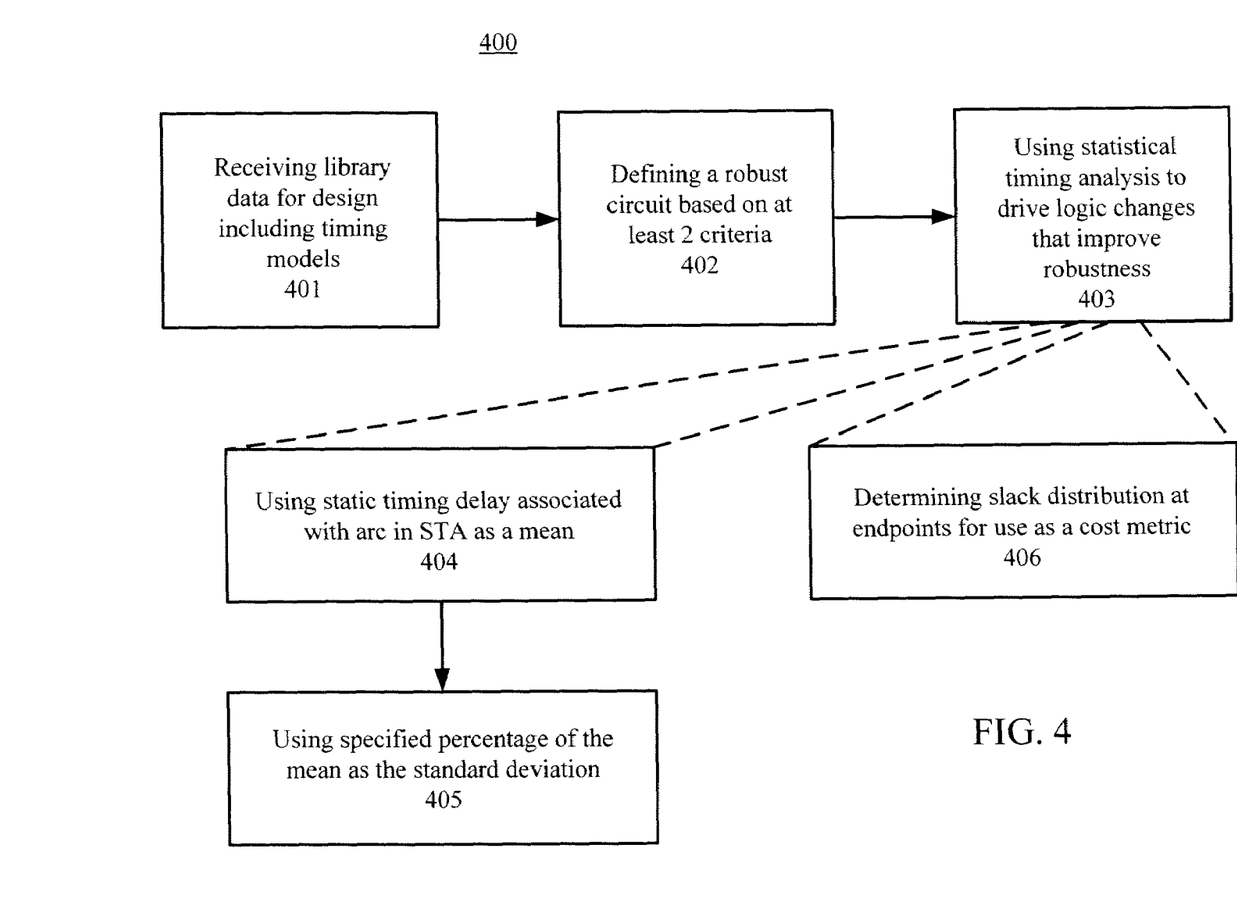
FIG. 4 illustrates an exemplary statistical timing analysis technique for generating circuits in a design flow for an implementation process.

FIG. 4 illustrates an exemplary technique 400 for generating circuits in a design flow for an implementation process. Step 401 receives library data for a design including timing models. Step 402 defines a robust circuit based on at least two of negative slack, endpoint slack distribution, timing constraint violations, and total negative slack. Step 403 uses statistical timing analysis to drive logic changes that generate improved robust circuits in the design.

The statistical timing analysis models a statistical delay distribution on an arc (i.e. a path between pins) of the design. Specifically, statistical timing analysis can use a static timing delay associated with the arc in static timing analysis as a mean (step 404) and a specified percentage of the mean as the standard deviation (step 405). The specified percentage can be obtained from an estimate of a clock budget for variations or an estimate of delay variations on a gate. In one embodiment, step 403 further includes determining a slack distribution at endpoints of the design for use as a cost metric in design optimization (step 406). For example, the cost metric can include computing a probability of an endpoint failing to meet timing constraints. The probability is computed from statistical timing analysis (which provides a probability density function for the arrival time at an end-point). Notably, this probability can also be used to improve the robustness of the design.

In another embodiment, the statistical slack of a pin (defined as the difference between the statistical mean required time and the statistical mean arrival time) can be used to judiciously select pins on which optimization is to be performed. Since statistical timing is able to differentiate pins with more critical paths from pins with fewer critical paths, i.e. such pins will have a worse statistical slack but identical static slack, the optimization is able to identify a good set of pins in the design which will reduce the number of violating paths effectively.

Technique 400 can be advantageously used in various optimization steps of the integrated circuit (IC) design flow (e.g. by way of example and not limitation synthesis, placement, clock tree analysis, and routing).

Although illustrative embodiments of the invention have been described in detail herein with reference to the accompanying figures, it is to be understood that the invention is not limited to those precise embodiments. They are not intended to be exhaustive or to limit the invention to the precise forms disclosed.

For example, technique 400 (FIG. 4) can be implemented in one or more computer programs (e.g. tool sets) that execute on a system including at least one processor. Each computer program can be implemented in a high-level procedural or object-oriented programming language, in assembly language, or in machine language. Suitable processors include, but are not limited to, general and special purpose microprocessors, as well as other types of micro-controllers. Generally, a processor will receive instructions and data from a read-only memory (ROM) and/or a random access memory (RAM). A computer can include one or more storage devices for storing data files. Exemplary storage devices can include magnetic disks, such as internal hard disks and removable disks, magneto-optical disks, and optical disks. Storage devices suitable for tangibly embodying computer program instructions and data can include various types of non-volatile memory, e.g. EPROM, EEPROM, and flash memory devices, magnetic disks such as internal hard disks and removable disks, magneto-optical disks, and CDROM disks.

Accordingly, it is intended that the scope of the invention be defined by the following Claims and their equivalents.

The invention claimed is:

1. A method of generating circuits in a design flow for an implementation process, the method comprising:
   receiving library data for a design including timing models;
   defining a robust circuit based on at least one of worst negative slack and total negative slack as well as at least one of endpoint slack distribution and number of timing constraint violations; and
   using statistical timing analysis, by processor, to drive logic changes that generate improved robust circuits in the design,
   wherein the statistical timing analysis models a statistical delay distribution on an arc of the design in static timing analysis, and
   wherein the statistical delay distribution on the arc includes:
      using a static timing delay associated with the arc in statistical timing analysis as a mean; and
      using a specified percentage of the mean as the standard deviation,
      wherein the specified percentage is obtained from one of an estimate of a clock budget for variations and an estimate of delay variations on a gate.

2. The method of claim 1, wherein the statistical timing analysis further includes determining a slack distribution at endpoints of the design for use as a cost metric in design optimization.

3. The method of claim 2, wherein the cost metric includes computing a probability of an endpoint failing to meet timing constraints.

4. The method of claim 2, wherein a statistical slack is used to identify bottlenecks in the design on which to carry out optimization.

5. A computer-readable medium embodying instructions that when executed by a processor would provide a tool set for generating circuits in a design flow for an implementation process, the tool set comprising:
   means for receiving library data for a design including timing models;
   means for defining a robust circuit based on at least one of worst negative slack and total negative slack as well as at least one of endpoint slack distribution and number of timing constraint violations; and
   means for using statistical timing analysis to drive logic changes that generate improved robust circuits in the design,
   wherein the statistical timing analysis models a statistical delay distribution on an arc of the design in static timing analysis, and
   wherein the statistical delay distribution on the arc includes:
      using a static timing delay associated with the arc in statistical timing analysis as a mean; and
      using a specified percentage of the mean as the standard deviation,
      wherein the specified percentage is obtained from one of an estimate of the clock budget for variations and from an estimate of delay variations on a gate.

6. The computer-readable medium of claim 5, wherein means for using the statistical timing analysis further includes means for determining a slack distribution at endpoints of the design for use as a cost metric in design optimization.

7. The computer-readable medium of claim 5, wherein the cost metric includes computing a probability of an endpoint failing to meet timing constraints.

8. The computer-readable medium of claim 5, wherein a statistical slack is used to identify bottlenecks in the design on which to carry out optimization.

* * * * *